Nov. 18, 1930.    J. V. CRICHTON    1,782,001
VARIABLE SPEED MECHANISM
Filed Nov. 29, 1929    2 Sheets-Sheet 2
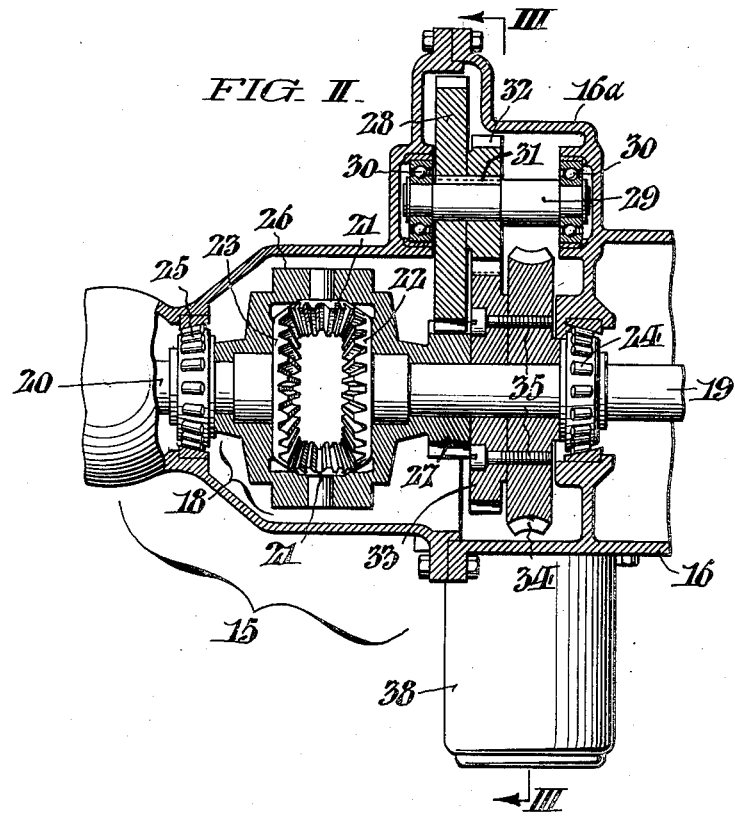
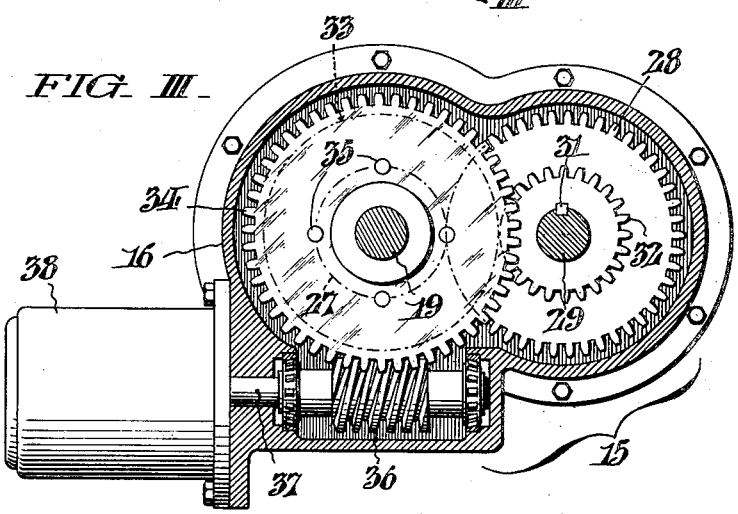
INVENTOR:
James V. Crichton Patented Nov. 18, 1930

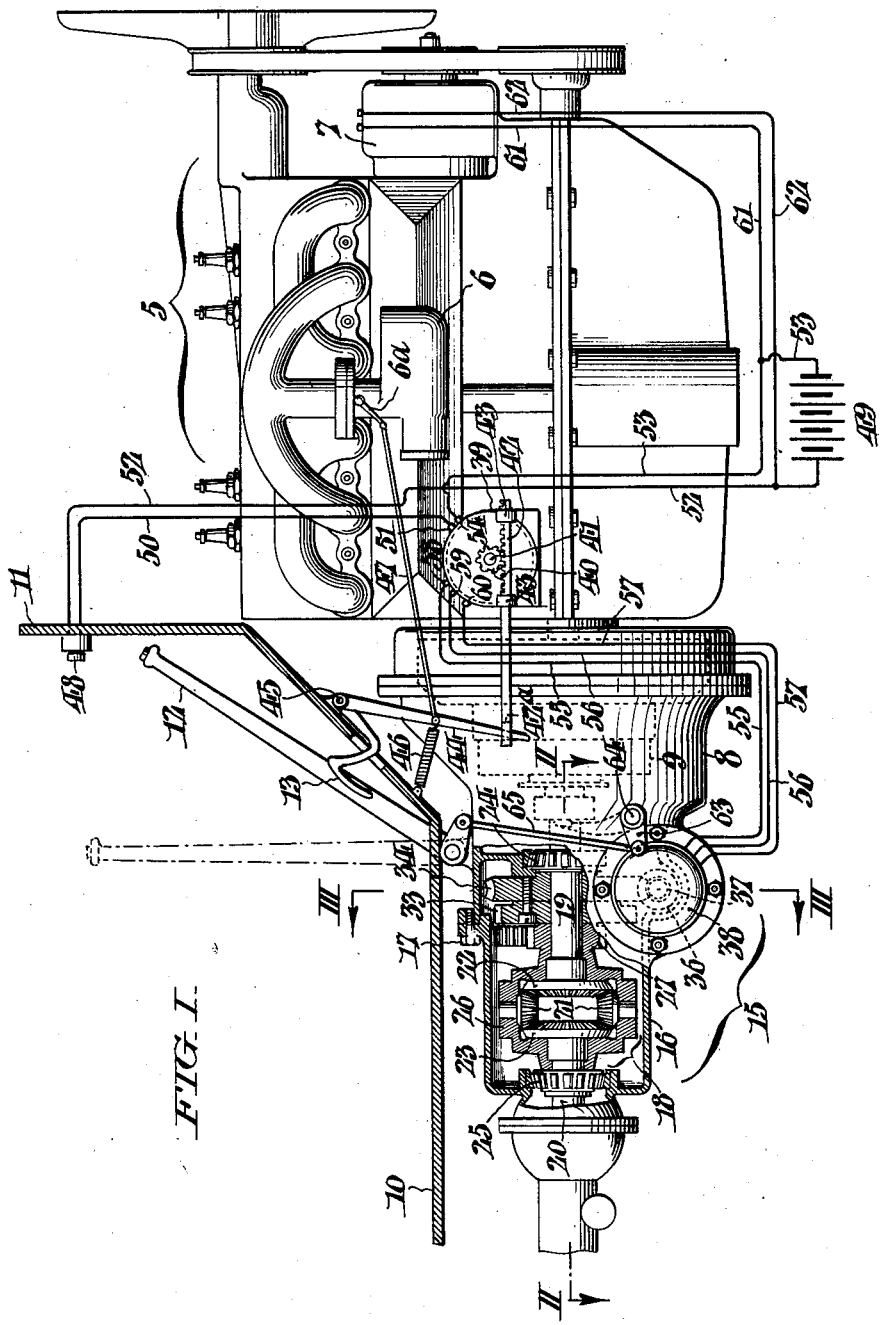

1,782,001

UNITED STATES PATENT OFFICE

JAMES V. CRICHTON, OF PHILADELPHIA, PENNSYLVANIA, ASSIGNOR OF ONE-HALF TO KARL SALBERG, OF PHILADELPHIA, PENNSYLVANIA

VARIABLE-SPEED MECHANISM

Application filed November 29, 1929. Serial No. 410,418.

This invention relates to variable speed mechanism, that is to say, to mechanism for transmission of power at variable speeds between a prime mover and the element which is to be driven.

The main objects of my invention are to enable transmission of power positively and at uniformly graduated speeds; and to provide a simple, reliable and inexpensive mechanism by which the indicated end is attained.

Although adaptable to many other uses, a transmission mechanism having the above attributes is highly advantageous in connection with automobiles and the like where uniformly graduated increases in the speed of propulsion synchronously with acceleration of the engine is desirable. Accordingly, my invention is directed in part toward provision of an organization with controls particularly suited to the specific use referred to; and I have therefore so shown and specifically described it hereinafter.

Still other objects and attendant advantages of this invention will be manifest from the detailed description following in coordination with the attached drawings, whereof Fig. I is a fragmentary view, more or less diagrammatically represented, showing my improved variable speed mechanism as applied to an automobile.

Fig. II is a fragmentary plan section through the transmission, taken as indicated by the arrows II—II in Fig. I; and, Fig. III is a cross section, taken as indicated by the arrows III—III in Figs. I and II.

With more detailed reference to these illustrations, 5 comprehensively designates the engine of the automobile, 6 the carburetor, 7 the generator of the electric system associated with the engine. 8 the housing for the clutch 9, 10 the floor of the automobile body, 11 the dash board, 12 the emergency brake lever and 13 the accelerator pedal. The variable speed transmission of my invention, generally indicated by the numeral 15, is designed to replace the usual transmission. As shown, it comprises a casing 16 which is secured to the end of the clutch housing 8 by bolts 17 and encloses a differential 18 that is interposed between the extension 19 of the engine shaft and the propelling shaft 20 for driving the rear wheels (not shown) of the vehicle. The differential 18 is of the bevel gear type with bevel pinions 21 in mesh with gears 22, 23 respectively attached to the engine shaft extension 19 and the propelling shaft 20, the thrust of said gears being resisted by roller bearings 24, 25 suitably seated in the casing 16 of the transmission. The floating member 26 of the differential 18, carrying the bevel pinions 21, is formed at one end with a spur pinion 27 that meshes with a larger gear 28 (Figs. II and III) fast on a counter-shaft 29 that rotates in ball bearings 30 in a lateral offset 16ª of the casing 16. Secured to the counter-shaft 29 by the same key 31 that serves the gear 28, is a spur pinion 32, which, in turn, meshes with a larger gear 33 loose on the engine shaft extension 19 with a worm wheel 34, said gear and worm wheel being secured together by screws 35. The worm wheel 34 is adapted to be driven by a worm 36 (Figs. I and III) splined on the shaft 37 of a starting motor 38, which is of the reversible field type, and, in the present instance, is bolted to one side of the transmission casing 16. The spur gears 27, 28, 32 and 33, with the worm gear couple 34, 36 obviously constitute a non-reversible speed reduction drive between the motor 38 and floating member 26 of the differential 15 for a purpose which will be fully explained presently.

To control the motor 38 I employ a rheostat of a rotary type such as conventionally shown at 39 in Fig. I, said rheostat being secured to one side of the engine casing and operable through rotation of a pinion 40 on its shaft 41 by a horizontally sliding rack bar 42 with guidance in bearings 43 afforded by the rheostat casing. At one end, the rack bar 42 has a slot 42ª which is engaged by a lever 44 secured to the axis 45 of the accelerator pedal 13, said lever being subject to a pull string 46, and coordinated, by means of a link rod 47, with the operating arm 6ª of the carburetor 6, the rheostat 39 and the carburetor 6 being thus jointly controlled by the accelerator pedal 13.

On the dash board 11 I mount a starting switch 48, which, through contacts (not shown) in the rheostat 39, closes the circuit between a storage battery conventionally shown at 49 and the motor 38, the interposed wiring connections including a conductor 50 leading from the switch 48 to a terminal 51 on the rheostat casing, another conductor 52 leading from said switch to one terminal of the battery 49, a conductor 53 leading from the other terminal of said battery to another terminal 54 on the rheostat casing, and three conductors 55, 56 and 57 which extend respectively between terminals 58, 59 and 60, also on the rheostat casing, to the motor 38. The battery 49 is charged, during operation of the engine 5, by the generator 7 through conductors 61, 62.

From Fig. 1 it will be noted that the usual clutch pedal is dispensed with. In lieu thereof, I attach an arm 63 to the clutch actuating shaft 64 with a link rod connection 65 to the emergency brake lever 12. Through this arrangement, the clutch 9 is released concurrently with retraction of the emergency brake lever 12 to the "on" position shown in dot-and-dash lines.

Thus, in preparation for starting the vehicle, the emergency brake lever 12 is moved from the retracted dot-and-dash line "on" position to the full line "off" position, with concurrent throwing in of the clutch 9 automatically through the medium of the link rod connection 65. The switch 48 is thereupon closed with attendant completion of the circuit between the battery 49 and the motor 38 through the rheostat 39 and the several conductors 50, 52 and 53, previously described. Rotary motion is under these conditions communicated at a reduced speed, through the interposed gearing 27, 28, 32, 33, 34 and 36, from the motor 38 to the floating member 26 of the differential 18 to the end that the bevel pinions 21 roll on the bevel gear 23, and drive the bevel gear 22 to turn over the engine. In this connection it is to be understood that the gears are so designed that their ratio bears a definite relation to the fixed maximum speed of the electric motor 38 and the idling speed of the engine 5 such as will preclude transmission of power to the propeller shaft 20 at starting. To set the vehicle in motion, the operator depresses the accelerator pedal 13 which action is initially attended only by feeding of a larger quantity of the gas to the engine 5 as permitted by the slot 42ª in the rack bar 42 for actuating the rheostat 39, but, as depression of the accelerator pedal 13 continues, the rheostat 39 is progressively rotated to interpose more and more resistance into the circuit to the motor 38, thereby effecting a graduated reduction in the speed of the latter while the engine 5 is at the same time further accelerated. As a consequence of attendant decrease in the rotation of the floating member 26 of the differential 18, proportionately, power is transmitted, through said differential, to the propeller shaft 20 to drive the rear wheels of the vehicle. By still further depression of the pedal 13, the rheostat 39 is rotatively advanced until the motor 38 is first stopped and then reversed in the direction of its motion through reversal of its field under the control of suitable switch means embodied in the rheostat 39, and resistance gradually cut out so that the motor 38 finally runs at its maximum speed in the reverse direction, with transmission of the maximum power and speed to the propeller shaft 20.

Having thus described my invention, I claim:

1. In variable speed drive mechanism, a differential interposed between the drive shaft of a source of power and an aligned shaft to be driven; independent means to drive the floating member of the differential; and a common means operative to control the source of power and for controlling the speed of said independent drive means to govern the floating member of the differential and thereby effect variation in the induced speed of the driven shaft.

2. In variable speed drive mechanism, a differential interposed between the drive shaft from a source of power and an aligned shaft to be driven; independent drive means coordinated, through irreversible gearing, with the floating member of the differential; and a common means operative to control the source of power and for controlling the speed of said independent drive means to govern the floating member of the differential and thereby effect variation in the induced speed of the driven shaft.

3. In variable speed drive mechanism a differential interposed between the drive shaft from a source of power and an aligned shaft to be driven; independent reversible means to drive the floating member of the differential in one direction or the other; and a common means operative to control the source of power and for controlling the speed of said independent drive means to govern the floating member of the differential and thereby effect variation in the induced speed of the driven shaft aforesaid.

4. In variable speed drive mechanism, a differential interposed between the drive shaft from a source of power and an aligned shaft to be driven; independent reversible drive means coordinated, through irreversible gearing, with the floating member of the differential; and a common means operative to control the source of power and for reversing and controlling the speed of said independent drive means to govern the floating member of the differential and thereby effect variation in the induced speed of the driven shaft aforesaid.

5. In variable speed drive mechanism, a differential interposed between the drive shaft from a source of power and an aligned shaft to be driven; an electric motor for independently driving the floating member of the differential; and a common means operative to regulate the source of power and for controlling the speed of the motor to govern the floating member of the differential and thereby effect variation in the induced speed of the driven shaft.

6. In variable speed drive mechanism; a differential interposed between the drive shaft from a source of power and an aligned shaft to be driven; a reversible electric motor for independently driving the floating member of the differential; and a common means actuable to regulate the source of power, effect reversal of the electric motor and for controlling its speed to govern the floating member of the differential and thereby effect variation in the induced speed of the driven shaft.

7. In variable speed drive mechanism; a differential interposed between the drive shaft of a source of power and an aligned shaft to be driven; a reversible electric motor for independently driving the floating member of the differential; and a common means actuable to regulate the source of power, effect reversal of the electric motor and for controlling its speed to govern the floating member of the differential and thereby effect variation in the induced speed of the driven shaft.

8. In variable speed drive mechanism for automobiles, a differential interposed between the engine shaft and an aligned propelling shaft; an independent motor for driving the floating member of the differential; and a common means for actuating the engine throttle and controlling the speed of said independent motor during operation of the automobile to govern the floating member of the differential and thereby effect variation in the induced speed of the propelling shaft.

9. In variable speed drive mechanism for automobiles, a differential directly interposed between the engine shaft and an aligned propelling shaft; an independent motor coordinated through irreversible gearing with the floating member of the differential; and a common means for actuating the carburetor throttle, and reversing said independent motor as well as controlling its speed to govern the floating member of the differential and thereby effect variation in the speed imparted to the propelling shaft.

10. In variable speed mechanism for automobiles, a differential interposed between the engine shaft and an aligned propelling shaft; an independent reversible motor coordinated, through irreversible gearing, with the floating member of the differential; and means co-ordinated with the accelerator pedal for actuating the carburetor throttle, as well as reversing the motor and controlling its speed to govern the floating member of the differential and thereby effect variation in the induced speed of the propelling shaft.

11. In variable speed mechanism for automobiles, a differential interposed between the engine and the propelling shaft; an independent reversible motor for driving the floating member of the differential; and means for controlling the engine and at the same time controlling the motor to govern the speed of the floating member, thereby to effect variation in the induced speed of the propelling shaft.

12. In variable speed mechanism for automobiles, a differential interposed between the engine and the propelling shaft; an independent reversible motor for driving the floating member of the differential; and means coordinated with the accelerator pedal controlling the engine whereby the motor is concurrently controlled to govern the floating member of the differential, thereby to effect variation in the induced speed of the propelling shaft.

In testimony whereof, I have hereunto signed my name at Philadelphia, Pennsylvania, this 26th day of November, 1929.

JAMES V. CRICHTON.